US007151830B2

(12) United States Patent
Carroll

(10) Patent No.: US 7,151,830 B2
(45) Date of Patent: Dec. 19, 2006

(54) METHOD, SYSTEM, PROGRAM PRODUCT AND STATE MACHINE REPRESENTATION FOR ENCRYPTING AND DECRYPTING A MESSAGE

(75) Inventor: Dennis J. Carroll, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 10/329,234

(22) Filed: Dec. 24, 2002

(65) Prior Publication Data

US 2004/0120524 A1    Jun. 24, 2004

(51) Int. Cl.
*H04K 1/00* (2006.01)
*H04L 9/00* (2006.01)
*H04L 9/28* (2006.01)

(52) U.S. Cl. .......................................... 380/28; 380/46
(58) Field of Classification Search ..................... None
See application file for complete search history.

(56) References Cited

U.S. PATENT DOCUMENTS

| | | | |
|---|---|---|---|
| 5,414,833 | A | 5/1995 | Hershey et al. |
| 5,737,607 | A | 4/1998 | Hamilton et al. |
| 5,841,872 | A | 11/1998 | Colvin, Sr. |
| 5,987,572 | A | 11/1999 | Weidner et al. |
| 2002/0037079 | A1 | 3/2002 | Duval |

FOREIGN PATENT DOCUMENTS

EP       1 098 248 A1    5/2001

WO       WO 01/47177 A1    6/2001

OTHER PUBLICATIONS

Development Practical Ideas for Improving Productivity and Quality, "Testing vs. Cleanroom: The Software Methods Controversy", By Nicholas Zvegintzov, Apr. 1996, pp. 4-6.
IBM Research Disclosure 41992, "Password Protection Using DES Security", Mar. 1999, p. 393.
Proceedings of the 1984 Symposium on Security and Privacy, Apr. 29-May 2, 1984, Oakland, California, Sponsored by the Technical Committee on Security and Privacy IEEE Computer Society, "Formal Verification of a Secure Network with End-To-End Encryption", By Dianne E. Britton, pp. 154-166.

(Continued)

*Primary Examiner*—Gilberto Barron, Jr.
*Assistant Examiner*—Benjamin E. Lanier
(74) *Attorney, Agent, or Firm*—Hoffman, Warnick & D'Alessandro LLC; William E. Schiesser

(57) ABSTRACT

Under the present invention, a state machine representation is used to encrypt/decrypt a message of data values. The state machine representation includes a plurality of nodes, wherein each of the data values are assigned to at least one of the plurality of nodes, wherein each of the plurality of nodes includes one or more transition vectors that each have a unique value, and wherein each of the one or more transition vectors starts from one of the plurality of nodes and leads to another one of the plurality of nodes. To encrypt the message, a sequence of transition vectors is traversed from a start node. As the transitional vectors are traversed, the corresponding unique values are recorded in sequence. When one of the data values is encountered at a node, a random number is generated and recorded in the sequence. Once all data values have been encountered, a string of the recorded unique values and the random values is outputted to a recipient.

30 Claims, 3 Drawing Sheets

OTHER PUBLICATIONS

"Mercy: A Fast Large Block Cipher for Disk Sector Encryption", By Paul Crowley, Date: Apr. 2000, http://www.ciphergoth.org/crypto/mercy/html/.

"A Hybrid Pipelined Path-Searching Architecture for Multiple Communications Applications", By Horng-Dar Lin and David G. Messerschmitt, pp. V-653-656, 1992.

"A Hybrid Pipelined Path-Searching Architecture for Multiple Communications Applications", By Horng-Dar Lin and David G. Messerschmitt, IEEE Transactions on Communications, vol. 44, No. 12, Dec. 1996, pp. 1640-1642.

METHOD, SYSTEM, PROGRAM PRODUCT AND STATE MACHINE REPRESENTATION FOR ENCRYPTING AND DECRYPTING A MESSAGE

BACKGROUND OF THE INVENTION

1. Field of the Invention

The present invention generally relates to a method, system, program product and state machine representation for encrypting and/or decrypting a message. Specifically, the present invention allows a message of data values to be encrypted and/or decrypted based on a string of values corresponding to a path of transitional vectors followed in a state machine representation.

2. Background Art

As the use of computer technology grows, security in message transmission is becoming an increasing concern. Specifically, today many businesses and governments transmit information over computer networks such as the Internet. In many cases, the information transmitted is of a secretive nature. For example, a business might need to transmit valuable trade secret information from one facility to another. Governments might need to transmit sensitive military or strategic information to allies and forces abroad. In any of these cases, the secret nature of the information must never be compromised.

To date, many systems for encrypting or otherwise securing data have been developed. One common methodology is to use a security key that is a pseudo-random number. The security key is used as an exclusive-OR (XOR) value against bytes in the data. Typically, the pseudo-random number is generated using a method known to both the sender and the intended recipient of the data. Once encrypted, the data is transmitted to the recipient who can then decrypt the data using a "seed" value and the pseudo-random number. Generally, a pseudo-random number generator on the sender side generates a new random number for each sequence of bytes to be encrypted. A pseudo-random number generator on the recipient side will generate the same sequence of pseudo-random numbers to decrypt the data. In methods such as these, there is a one to one correspondence of encrypted bytes to source bytes.

Unfortunately, related methods such as these create various security risks. For example, the encryption can be broken through trial and error. Specifically, security under these methods relies the complexity of the pseudo-random number (i.e., the "mask"). The more bits the mask has, the longer it will take to decrypt the message. However, given the advanced nature of today's computer technology, any encrypted data set (regardless of bit quantity in the mask) can be decrypted through trial and error in finite time.

In view of the foregoing, there exists a need for a method, system, program product and state machine representation for encrypting and/or decrypting a message. Specifically, a need exists for a message of data values to be encrypted and/or decrypted based on a string of values corresponding to a path of transitional vectors followed in a state machine representation. Further, a need exists for a system in which there need not be any necessary relationship between encrypted bytes and source bytes.

SUMMARY OF THE INVENTION

In general, the present invention provides a method, system, program product and state machine representation for encrypting and/or decrypting a message. Specifically, under the present invention, a state machine representation is provided. The state machine representation typically includes a set of nodes that are interconnected by transitional vectors, with each transitional vector being assigned a unique value. Some or all of the nodes in the state machine representation are assigned data values from the message, with each data value being assigned to at least one of the nodes. To encrypt the message, a start node will be identified and any path of transitional vectors will be traversed from node to node. As each transitional vector is traversed, its corresponding unique number will be recorded in sequence. When one of the data values in the message to be encrypted is encountered/reached at a node, a random number that is not representative of any of the transitional vectors is generated and recorded (in sequence with the unique values). This process continues until all of the data values in the message have been encountered/reached. Once complete, the recorded string of unique values and random values is outputted to a recipient who has access to a copy of the state machine representation. Using the string of values, the recipient can follow the sequence/path of transitional vectors traversed in encrypting the message to recover the data values.

According to a first aspect of the present invention, a method for encrypting a message of data values is provided. The method comprises: (1) providing a state machine representation having a plurality of nodes, wherein each of the data values are assigned to at least one of the plurality of nodes, wherein each of the plurality of nodes includes one or more transition vectors that each have a unique value, and wherein each of the one or more transition vectors starts from one of the plurality of nodes and leads to another one of the plurality of nodes; (2) selecting a starting node and traversing along any of the transition vectors, recording in sequence, the unique values for the transition vectors traversed; and (3) recording a random value not representative of a transition vector in sequence with the unique values upon reaching one of the data values.

According to a second aspect of the present invention, a method for encrypting a message of data values is provided. The method comprises: (1) providing a state machine representation having a plurality of nodes, wherein each of the data values are assigned to at least one of the plurality of nodes, wherein each of the plurality of nodes includes one or more transition vectors that each have a unique value, and wherein each of the one or more transition vectors starts from one of the plurality of nodes and leads to another one of the plurality of nodes; (2) selecting a starting node and traversing along any of the transition vectors, recording in sequence, the unique values for the transition vectors traversed; (3) recording in sequence a random value not representing one of the transition vectors upon reaching one of the data values; and (4) continuing to traverse along any of the transition vectors, recording in sequence, the unique values for the transition vectors traversed until a next one of the data values is reached whereupon a next random value not representing one of the unique values of a transition vector is recorded in sequence, continuing until all of the data values are reached.

According to a third aspect of the present invention, a method for decrypting a message of data values is provided. The method comprises: (1) providing a state machine representation having a plurality of nodes, wherein each of the data values are assigned to at least one of the plurality of nodes, wherein each of the plurality of nodes includes one or more transition vectors that each have a unique value, and wherein each of the one or more transition vectors starts from one of the plurality of nodes and leads to another one of the plurality of nodes; (2) providing a string of values, wherein the string of values includes unique values corresponding to the transition vectors and random values corresponding to the data values, as recorded in sequence during encryption of the message; (3) selecting a starting node in the state machine representation and traversing along a path of the transition vectors according to the unique values in the string of values; and (4) recovering the data values as the random values in the string of values are reached.

According to a fourth aspect of the present invention, a state machine representation for encrypting a message of data values is provided. The state machine representation comprises: a plurality of nodes, wherein each of the data values are assigned to at least one of the plurality of nodes, wherein each of the plurality of nodes includes one or more transition vectors that each have a unique value, and wherein each of the one or more transition vectors starts from one of the plurality of nodes and leads to another one of the plurality of nodes.

According to a fifth aspect of the present invention, a system for encrypting a message of data values is provided. The system comprises: (1) a vector system for traversing along a set of transition vectors between a plurality of nodes in a state machine representation, wherein each of the data values are assigned to at least one of the plurality of nodes, wherein each of the set of transition vectors have a unique value, and wherein each of the set of transition vectors starts from one of the plurality of nodes and leads to another one of the plurality of nodes; (2) a recording system for recording the unique values in sequence as the set of transition vectors is traversed; and (3) a generation system for generating a random value when one of the data values is reached, wherein the recording system further records the random values in sequence with the unique values.

According to a sixth aspect of the present invention, a system for decrypting a message of data values is provided. The system comprises: (1) an access system for accessing a state machine representation having a plurality of nodes, wherein each of the data values are assigned to at least one of the plurality of nodes, wherein each of the plurality of nodes includes one or more transition vectors that each have a unique value, and wherein each of the one or more transition vectors starts from one of the plurality of nodes and leads to another one of the plurality of nodes; (2) an input system for receiving a string of values, wherein the string of values includes unique values corresponding to the transition vectors and random values corresponding to the data values, as recorded in sequence during encryption of the message; (3) a path system for traversing along a path of the transition vectors according to the unique values in the string of values; and (4) a data value system for recovering the data values as the random values in the string of values are reached.

According to a seventh aspect of the present invention, a program product stored on a recordable medium for encrypting a message of data values is provided. When executed, the program product comprises: (1) program code for traversing along a set of transition vectors between a plurality of nodes in a state machine representation, wherein each of the data values are assigned to at least one of the plurality of nodes, wherein each of the set of transition vectors have a unique value, and wherein each of the set of transition vectors starts from one of the plurality of nodes and leads to another one of the plurality of nodes; (2) program code for recording the unique values in sequence as the set of transition vectors is traversed; and (3) program code for generating a random value when one of the data values is reached, wherein the program code for recording further records the random values in sequence with the unique values.

According to an eighth aspect of the present invention, a program product stored on a recordable medium for decrypting a message of data values is provided. When executed, the program product comprises: (1) program code for accessing a state machine representation having a plurality of nodes, wherein each of the data values are assigned to at least one of the plurality of nodes, wherein each of the plurality of nodes includes one or more transition vectors that each have a unique value, and wherein each of the one or more transition vectors starts from one of the plurality of nodes and leads to another one of the plurality of nodes; (2) program code for receiving a string of values, wherein the string of values includes unique values corresponding to the transition vectors and random values corresponding to the data values, as recorded in sequence during encryption of the message; (3) program code for traversing along a path of the transition vectors according to the unique values in the string of values; and (4) program code for recovering the data values as the random values in the string of values are reached.

Therefore, a method, system, program product and state machine representation for encrypting and decrypting a message is provided.

BRIEF DESCRIPTION OF THE DRAWINGS

These and other features of this invention will be more readily understood from the following detailed description of the various aspects of the invention taken in conjunction with the accompanying drawings in which.

Figure 1:
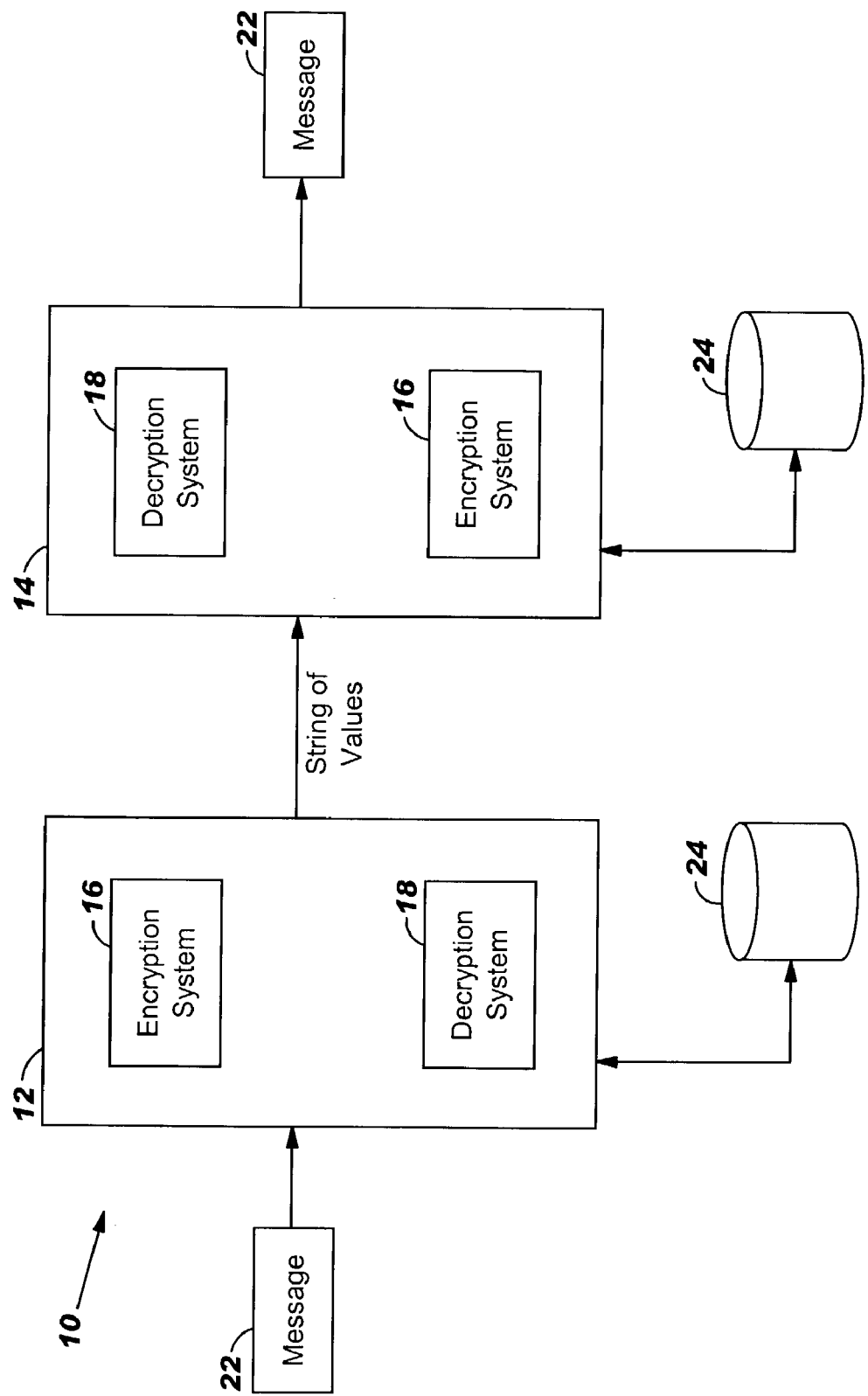
FIG. 1 depicts an encryption/decryption system according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, program product and state machine representation for encrypting and/or decrypting a message. Specifically, under the present invention, a state machine representation is provided. As used herein, the term "state machine representation" is intended to refer to a set of data that is used to define nodes and interconnections there between. The state machine representation typically includes a set of nodes that are interconnected by transitional vectors, with each transitional vector being assigned a unique value. Some or all of the nodes in the state machine representation are assigned data values from the message, with each data value being assigned to at least one of the nodes. To encrypt the message, a start node will be identified and any path of transitional vectors will be traversed from node to node. As each transitional vector is traversed, its corresponding unique number will be recorded in sequence. When one of the data values in the message to be encrypted is encountered/reached at a node, a random number that is not representative of any of the transitional vectors is generated and recorded (in sequence with the unique values). This process continues until all of the data values in the message have been encountered/reached. Once complete, the recorded string of unique values and random values is outputted to a recipient who has access to a copy of the state machine representation. Using the string of values, the recipient can follow the sequence/path of transitional vectors traversed in encrypting the message to recover the data values.

Referring now to FIG. 1, system 10 for encrypting/decrypting a message of data values is shown As depicted, system 10 includes source system 12 and destination system 14. As will be further described below, source system 12 and destination system 14 are intended to represent any individual, entity or system that has access to a state machine representation for encrypting/decrypting message 22 of data values. In a typical embodiment, source system 12 and destination system 14 are computerized systems that communicate over a network.

Under the present invention, message 22 of data values is encrypted/decrypted using a state machine representation that both source system 12 and destination system 14 can access. To this extent, separate "copies" of the state machine representation could be stored in databases 24. Alternatively, the state machine representation could be stored in a single location that both source system 12 and destination system 14 can access. As shown, source system 12 and destination system 14 include encryption system 16 as well as decryption system 18. It should be appreciated that source system 12 and destination system 14 are shown to include both encryption system 16 and decryption system 18 to illustrate that information could be communicated in either direction between source system 12 and to destination system 14. Moreover, as will be further discussed below, encryption system 16 and decryption system 18 are shown as separate systems for illustrative purposes only. It should be understood that encryption system 16 and decryption system 18 systems could be combined into a single encryption/decryption system.

Figure 2:
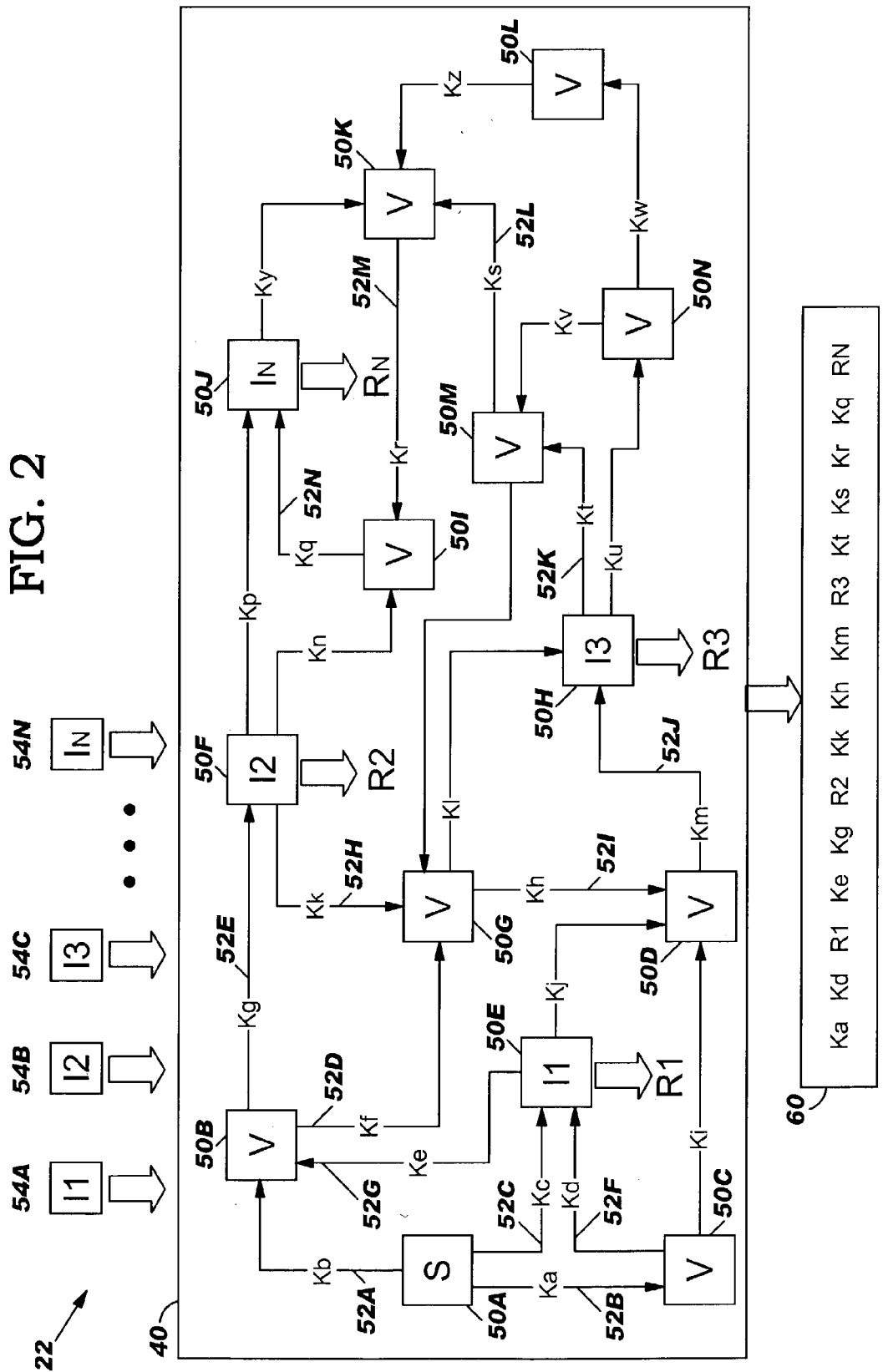
FIG. 2 depicts a state machine representation as used by the system of FIG. 1.

Referring now to FIG. 2, an illustrative state machine representation 40 according to the present invention is shown. As depicted, state machine representation 40 includes nodes 50A–N. Each node 50A–N has at least one transitional vector (interconnection) that leads to one of the other nodes 50A–N. For example, node 50A has transitional vectors 52A–C. Similarly node 50B has transitional vectors 52D–E. It should be appreciated that many transitional vectors in FIG. 2 have not been labeled with reference numerals for clarity of illustration purposes only. As further shown, each of the transitional vectors 52A–N has a unique value assigned thereto. For example, transitional vector 52A has the unique value Kb, while transitional vector 52B has been assigned the unique value Ka. To this extent, it can be seen that no two transitional vectors from a single node have been assigned the same unique value. To this extent, the quantity of possible transitional vectors for each node 50A–N is limited only by the number of bits (B) in the unique values. Specifically, each node 50A–N can have $2^B$ transitional vectors. Accordingly, if each unique value has 8 bits, each node 50A–N can have up to 256 transitional vectors. It should be appreciated that state machine representation 40 depicted in FIG. 2 is intended to be illustrative only, and other more complex variations (e.g., 3-dimensional) could be implemented.

To encrypt message 22 using state machine representation 40, data values 54A–N of message 22 are assigned to one or more nodes 50A–N (e.g., by encryption system 16 of FIG. 1). In a typical embodiment, there are more nodes 50A–N than data values 54A–N. Accordingly, it is possible for one or more nodes 50A–N not to be assigned one of data values 54A–N. Moreover, it is possible for a node to be assigned more than one data value (i.e., each node 50A–N is assigned zero or more data values 54A–N). As can be seen in FIG. 2, data values 54A–N have been assigned to nodes 50E, 50F, 50H, and 50J, respectively. Nodes that have not been assigned data values can be assigned non-data values V.

Once data values 54A–N have been assigned to nodes, encryption system 16 will select a start node (S). In this example, the start node (S) is node 50A. Once selected, encryption system 16 will traverse any path of transitional vectors from node to node. It should be appreciated that the path followed for encryption could be any randomly selected path through state machine representation 40. Alternatively, the path followed could be the shortest path necessary to encounter/reach all data values 54A–N. In any event, as the transitional vectors are being traversed, the unique values corresponding thereto will be recorded in sequence. When one of data values 54A–N is encountered/reached at a node, encryption system 16 will generate a random value (e.g., a random number) that is not representative of the transitional vectors or the unique values. This random value will then be recorded in sequence with the unique values. The process will be continued until all of data values 54A–N have been encountered/reached.

Once traversal is complete, string of values 60 representing all of the unique values and random values recorded in sequence during encryption will be assembled. String of values 60 illustrates the path that was followed during encryption of message 22. For example, for string of values 60 shown, the following path was followed, and values recorded:

From node 50A to node 50C along transitional vector 52B recording unique value Ka.

From node 50C to node 50E along transition vector 52F recording unique value Kd.

At node 50E, random number R1 was generated and recorded.

From node 50E to node 50B along transitional vector 52G recording unique value Ke.

From node 50B to node 50F along transitional vector 52E recording unique value Kg.

At node 50F, random number R2 was generated and recorded.

From node 50F to node 50G along transitional vector 52H recording unique value Kk.

From node 50G to node 50D along transitional vector 52I recording unique value Kh.

From node 50D to node 50H along transitional vector 52J recording unique value Km.

At node 50H, random number R3 was generated and recorded.

From node 50H to node 50M along transitional vector 52K recording unique value Kt.

From node 50M to node 50K along transitional vector 52L recording unique value Ks.

From node 50K to node 50I along transitional vector 52M recording unique value Kr.

From node 50I to node 50J along transitional vector 52N recording unique value Kq.

At node 50J, random number R4 was generated and recorded. Thus, as can be seen, string of values 60 provides the precise path that was followed through state machine representation 40. It also indicates which nodes had been assigned data values 54A–N. In addition, string of values 60 shows that there is no necessary interrelationship between unique values and random values. Specifically, each random value (R) in string of values 60 can be preceded or followed by any quantity of unique values. This helps prevent both the quantity of data values 54A–N and the path through state machine representation 40 from being determined.

Once assembled, string of values 60 is transmitted to destination system 14, where decryption system 18 will use the sequence of unique values and random values to recover data values 54A–N from state machine representation 40. As indicated above, destination system 14 has access to the same state machine representation 40 used to encrypt message 22. Once string of values 60 is received, decryption system 18 will follow the path of transitional vectors that correspond to the unique values in string of values 60. When destination system 18 gets to a random value in string of values 60, it is "alerted" that a data value must be present at that node. For example, after destination system follows transitional vectors 52B and 52F to node 50E (according to unique values Ka and Kd), the next value in string of values is random value R1. This informs destination system 18 that a data value (i.e., data value 54A) is present at node 50E. In response, destination system 18 will recover data value 54A. If a random value is out of sequence in string of values 60, decryption system 18 would recover a non-data value V, which would not lead to an accurate recovery of message 22.

Figure 3:
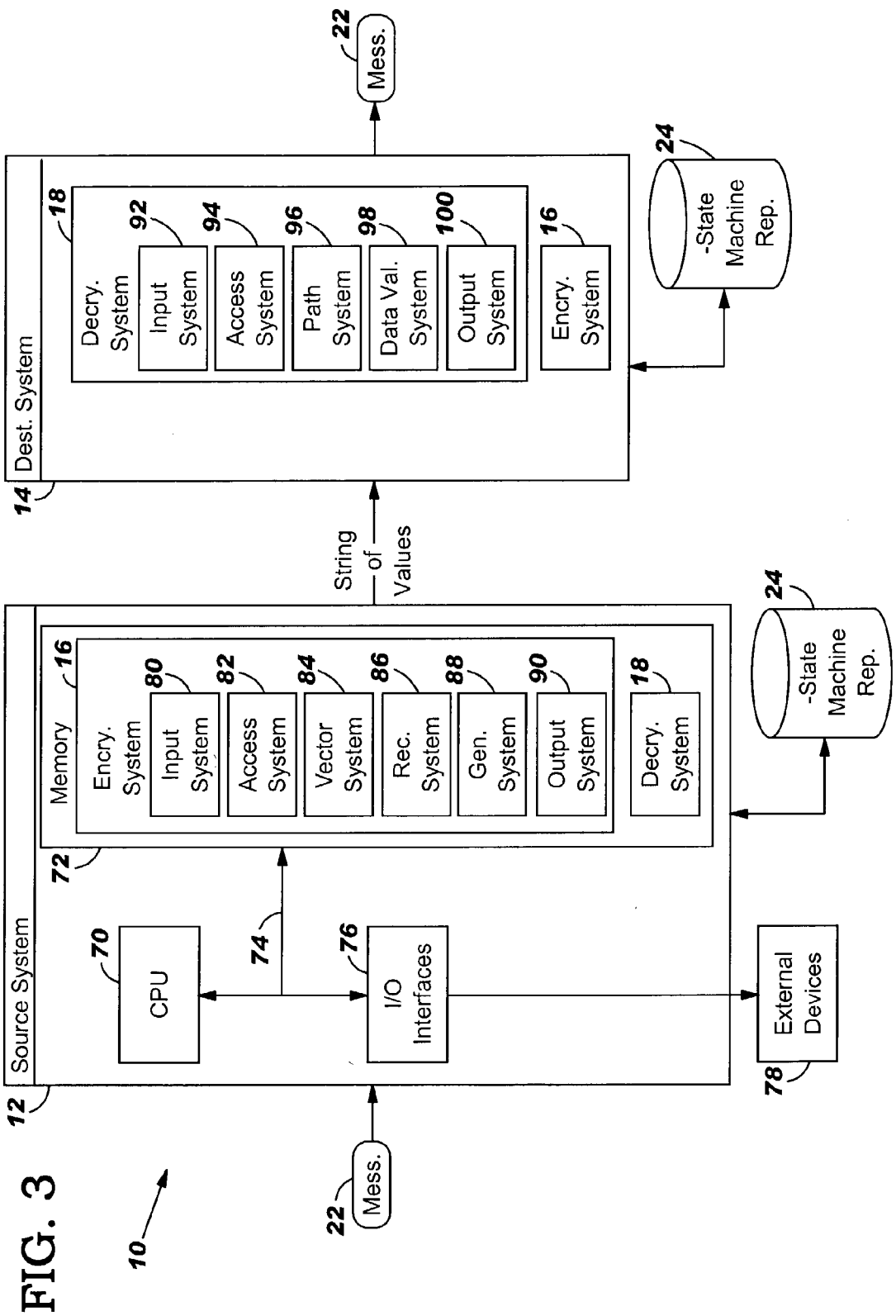
FIG. 3 depicts a more detailed diagram of the system of FIG. 1.

Referring now to FIG. 3, a more detailed diagram system 10 of FIG. 1 is shown. In FIG. 3, source system 12 and destination system 14 are computerized systems. Such systems can be any type of computerized system that can send and receive information (i.e., a string of values). Examples include, among others, personal computers, workstations, personal digital assistants, etc. However, as indicated above, it should be understood that the teachings described herein could be performed manually (e.g., by individuals or entities) without the use of computerized systems. As shown, source system 12 generally comprises central processing unit (CPU) 70, memory 72, bus 74, input/output (I/O) interfaces 76 and external devices/resources 78. CPU 70 may comprise a single processing unit, or be distributed across one or more processing units in one or more locations, e.g., on a client and server. Memory 72 may comprise any known type of data storage and/or transmission media, including magnetic media, optical media, random access memory (RAM), read-only memory (ROM), a data cache, a data object, etc. Moreover, similar to CPU 70, memory 72 may reside at a single physical location, comprising one or more types of data storage, or be distributed across a plurality of physical systems in various forms.

I/O interfaces 76 may comprise any system for exchanging information to/from an external source. External devices/resources 78 may comprise any known type of external device, including speakers, a CRT, LED screen, hand-held device, keyboard, mouse, voice recognition system, speech output system, printer, monitor, facsimile, pager, etc. Bus 74 provides a communication link between each of the components in source system 12 and likewise may comprise any known type of transmission link, including electrical, optical, wireless, etc. In addition, although not shown, additional components, such as cache memory, communication systems, system software, etc., may be incorporated into source system 12.

It should be understood that although not shown for brevity purposes, destination system 14 typically includes computerized components (e.g., CPU, memory, bus, I/O interfaces, external devices, etc.) similar to source system 12. It should also be understood that communication between source system 12 and destination system 14 can occur via a direct hardwired connection (e.g., serial port), or via an addressable connection in a client-server (or server-server) environment which may utilize any combination of wireline and/or wireless transmission methods. In the case of the latter, the server (not shown in FIG. 3) and client may be connected via the Internet, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server Databases 24 are optional and could provide storage for information such as, for example, state machine representation 40, string of values 60, etc. As such, databases 24 may include one or more storage devices, such as a magnetic disk drive or an optical disk drive. In another embodiment, databases 24 include data distributed across, for example, a local area network (LAN), wide area network (WAN) or a storage area network (SAN) (not shown). Databases 24 may also be configured in such a way that one of ordinary skill in the art may interpret them to include one or more storage devices.

Shown in memory 72 of source system (as program products) are encryption system 16 and decryption system 18. It should be understood that systems 16 and 18 are separately shown for illustrative purposes only, and that systems 16 and 18 could be combined into a single encryption/decryption system. As indicated above, message 22 having data values 54A–N (FIG. 2) is encrypted by assigning each data value 54A–N to one or more nodes 50A–N in state machine representation 40. In one embodiment, data values 54A–N can be assigned to nodes 50A–N in state machine representation 40 by an "assignment" system that is separate from source system 12 and destination system 14. In this embodiment, state machine representation 40 is made accessible to both source system 12 and destination system 14. For example, state machine representation 40 can then be transmitted to both source system 12 and destination system 14 for storage in databases 24. Alternatively, state machine representation 40 could be transmitted to a single storage system that is accessible to both. In another embodiment, message 22 and a state machine representation "template" are received by input system 80 of encryption system 26. Upon reception, input system 80 can assign data values 54A–N to nodes 50A–N in the template to yield the final state machine representation 40. Then, state machine representation 40 can be transmitted to destination system 14 via output system 90.

In any event, after all data values 54A–N are assigned to at least one of nodes 50A–N, access system 82 will access state machine representation 40 (e.g., in database 24, cache, etc.) to generate string of values 60. Specifically, upon accessing state machine representation 40, vector system 84 will select a start node and begin traversing transitional vectors from node to node. As indicated above, any path of transitional vectors can be followed. As the transitional vectors are being traversed, the unique values assigned thereto will be recorded in sequence by recording system 86. When one of data values 54A–N is encountered/reached at a node, generation system 88 will generate a random value (e.g., random number) that is not representative of either the transitional vectors or the unique values corresponding thereto. After being generated, recording system 86 will record the random value in sequence with the unique values. After recording the random value, vector system 84 will continue to traverse the transitional vectors as recording system 86 records the corresponding unique values in sequence. When another one of data values 54A–N is encountered/reached, generation system 88 generates another random value that recording system 86 records in sequence. This process continues until all data values 54A–N have been encountered/reached.

Once the process is complete, output system 90 will assemble all of the recorded values into string of values 60 and transmit the string of values 60 to destination system 14. As shown, decryption system 18 (program product) on destination system 14 includes input system 92, access system 94, path system 96, data value system 98 and output system 100. String of values 60 is received by input system 92. Upon receiving string of values 60, access system 94 will access state machine representation 40 (e.g., in database 24, cache, etc.). Once accessed, path system 96 will follow the path used to encrypt message 22 based on string of values 60. Specifically, path system 96 will traverse the sequence of transitional vectors corresponding to the unique values in string of values 60. If a random value is encountered in string of values 60, data value system 98 will recover the data value from the particular node. For example, after traversing along transitional vector 52F to node 50E in response to unique value Kd, path system 96 will encounter random value R1 in string of values 60. Upon encountering R1, data value system 98 will recover data value 54A from node 50E. Path system will then continue to traverse the transitional vectors that correspond to the unique values in string of values 60 until all data values 54A–N have been recovered. Once all data values 54A–N have been recovered, output system 100 can then output message 22. As can be seen it is important for all unique values and random values to be recorded in their proper sequence. If one or more of the values are recorded out of sequence, message 22 will likely not be recovered.

As indicated above, it should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed:

1. A method for encrypting a message of data values, comprising:
    providing a state machine representation having a plurality of nodes, wherein each of the data values are assigned to at least one of the plurality of nodes, wherein each of the plurality of nodes includes one or more transition vectors that each have a unique value, and wherein each of the one or more transition vectors starts from one of the plurality of nodes and leads to another one of the plurality of nodes;
    selecting a starting node and traversing along any of the transition vectors, recording in sequence, the unique values for the transition vectors traversed;
    recording a random value not representative of a transition vector in sequence with the unique values upon reaching one of the data values;
    continuing to traverse along any of the transition vectors, recording in sequence, the unique values for the transition vectors traversed and random values not representing one of the transition vectors until all of the data values have been reached; and
    outputting a string of values that includes the unique values and the random values as recorded in sequence.

2. The method of claim 1, further comprises decrypting the message of data values with the following steps:
    receiving the string of values;
    accessing the state machine representation;
    selecting the starting node and traversing along the transition vectors traversed during encryption of the message of data values, according to the unique values as recorded in sequence in the string of values; and
    recovering one of the data values when one of the random values in the string of values is reached.

3. The method of claim 1, wherein each of the plurality of nodes is assigned zero or more data values.

4. The method of claim 1, wherein the random value is a random number.

5. The method of claim 1, further comprising generating the random value prior to recording the random value.

6. The method of claim 1, wherein the transition vectors traversed along are randomly selected.

7. A method for decrypting a message of data values, comprising:
    providing a state machine representation having a plurality of nodes, wherein each of the data values are assigned to at least one of the plurality of nodes, wherein each of the plurality of nodes includes one or more transition vectors that each have a unique value, and wherein each of the one or more transition vectors starts from one of the plurality of nodes and leads to another one of the plurality of nodes;
    providing a string of values, wherein the string of values includes unique values corresponding to the transition vectors and random values corresponding to the data values, as recorded in sequence during encryption of the message;

selecting a starting node in the state machine representation and traversing along a path of the transition vectors according to the unique values in the string of values; and recovering the data values as the random values in the string of values are reached.

8. The method of claim 7, wherein the random values are not representative of any of the transition vectors.

9. The method of claim 7, wherein the random values are random numbers.

10. The method of claim 7, further comprising outputting the recovered data values as a decrypted message.

11. A state machine representation for encrypting a message of data values for use by a computerized message encryption system, comprising a plurality of nodes, wherein each of the data values are assigned to at least one of the plurality of nodes, wherein each of the plurality of nodes includes one or more transition vectors that each have a unique value, and wherein each of the one or more transition vectors starts from one of the plurality of nodes and leads to another one of the plurality of nodes.

12. The state machine representation of claim 11, wherein each of the plurality of nodes are assigned zero or more of the data values.

13. The state machine representation of claim 11, wherein each of the data values corresponds to a randomly generated value that does not represent any of the transition vectors.

14. The state machine representation of claim 11, wherein a quantity of available transitional vectors for each of the plurality of nodes is based on a number of bits of the unique values.

15. A system for encrypting a message of data values, comprising:

a vector system for traversing along a set of transition vectors between a plurality of nodes in a state machine representation, wherein each of the data values are assigned to at least one of the plurality of nodes, wherein each of the set of transition vectors have a unique value, and wherein each of the set of transition vectors starts from one of the plurality of nodes and leads to another one of the plurality of nodes;

a recording system for recording the unique values in sequence as the set of transition vectors is traversed;

a generation system for generating a random value when one of the data values is reached, wherein the recording system further records the random values in sequence with the unique values; and an output system for outputting a string of values, wherein the string of values includes the unique values and the random values recorded in sequence as the set of transition vectors are traversed.

16. The computer-implemented system of claim 15, wherein the random value does not represent any of the transition vectors.

17. The computer-implemented system of claim 15, wherein the random value is a random number.

18. The computer-implemented system of claim 15, wherein each of the plurality of nodes is assigned zero or more of the data values.

19. A computer-implemented system for decrypting a message of data values, comprising:

an access system for accessing a state machine representation having a plurality of nodes, wherein each of the data values are assigned to at least one of the plurality of nodes, wherein each of the plurality of nodes includes one or more transition vectors that each have a unique value, and wherein each of the one or more transition vectors starts from one of the plurality of nodes and leads to another one of the plurality of nodes;

an input system for receiving a string of values, wherein the string of values includes unique values corresponding to the transition vectors and random values corresponding to the data values, as recorded in sequence during encryption of the message;

a path system for traversing along a path of the transition vectors according to the unique values in the string of values; and a data value system for recovering the data values as the random values in the string of values are reached.

20. The computer-implemented system of claim 19, wherein the random values are not representative of any of the transition vectors.

21. The computer-implemented system of claim 19, wherein the random values are random numbers.

22. The computer-implemented system of claim 19, further comprising an output system for outputting the recovered data values as a decrypted message.

23. A program product stored on a recordable medium for encrypting a message of data values, which when executed, comprises:

program code for traversing along a set of transition vectors between a plurality of nodes in a state machine representation, wherein each of the data values are assigned to at least one of the plurality of nodes, wherein each of the set of transition vectors have a unique value, and wherein each of the set of transition vectors starts from one of the plurality of nodes and leads to another one of the plurality of nodes;

program code for recording the unique values in sequence as the set of transition vectors is traversed;

program code for generating a random value when one of the data values is reached, wherein the program code for recording further records the random values in sequence with the unique values; and program code for outputting a string of values, wherein the string of values includes the unique values and the random values recorded in sequence as the set of transition vectors are traversed.

24. The program product of claim 23, wherein the random value does not represent any of the transition vectors.

25. The program product of claim 23, wherein the random value is a random number.

26. The program product of claim 23, wherein each of the plurality of nodes is assigned zero or more of the data values.

27. A program product stored on a recordable medium for decrypting a message of data values, which when executed, comprises:

program code for accessing a state machine representation having a plurality of nodes, wherein each of the data values are assigned to at least one of the plurality of nodes, wherein each of the plurality of nodes includes one or more transition vectors that each have a unique value, and wherein each of the one or more transition vectors starts from one of the plurality of nodes and leads to another one of the plurality of nodes;

program code for receiving a string of values, wherein the string of values includes unique values corresponding to the transition vectors and random values corresponding to the data values, as recorded in sequence during encryption of the message;

program code for traversing along a path of the transition vectors according to the unique values in the string of values; and program code for recovering the data values as the random values in the string of values are reached.

28. The program product of claim 27, wherein the random values are not representative of any of the transition vectors.

29. The program product of claim 27, wherein the random values are random numbers.

30. The program product of claim 27, further comprising program code for outputting the recovered data values as a decrypted message.

* * * * *